March 2, 1948.   S. KROLL ET AL   2,437,098
BABY CARRIAGE WITH DETACHABLE BODY
Filed June 26, 1944   2 Sheets-Sheet 1

INVENTORS.
SAMUEL KROLL & NATHAN J. KROLL
BY
Their Attorney

March 2, 1948.   S. KROLL ET AL   2,437,098
BABY CARRIAGE WITH DETACHABLE BODY
Filed June 26, 1944   2 Sheets-Sheet 2
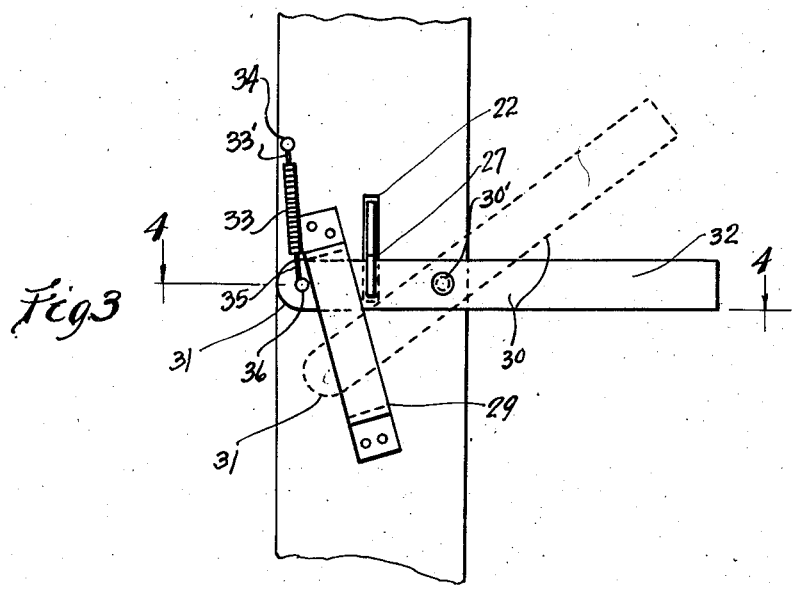
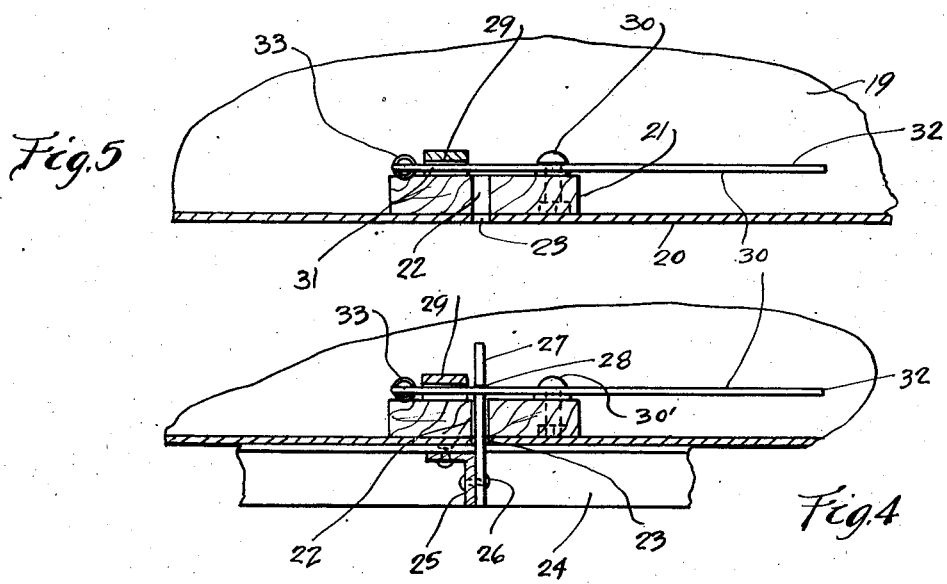
INVENTORS
SAMUEL KROLL & NATHAN J. KROLL.
BY
Their Attorney

UNITED STATES PATENT OFFICE 2,437,098

BABY CARRIAGE WITH DETACHABLE BODY

Samuel Kroll and Nathan J. Kroll, Chicago, Ill.

Application June 26, 1944, Serial No. 542,123

2 Claims. (Cl. 296—35)

This invention relates to certain novel improvements in baby carriages and more particularly to a baby carriage in which the carriage body may conveniently, and without any great effort upon the part of the mother, be detached from the carriage chassis.

The invention has among its objects the provision of an improved construction of this character which will be highly efficient in use and economical in manufacture.

While the main and principal object of the invention is the ready detachability of the carriage body from the chassis, it is obvious that the carriage body may be of the collapsible type, such as that shown in our copending applications, Serial Nos. 533,132, now Patent No. 2,431,259, granted November 18, 1947, and 533,133, or the body itself may be rigid and only the chassis collapsible. In either case, the result is the same.

It is not infrequent that occasion requires where the mother desires to place the baby carriage in an automobile or other vehicle, with the baby confined in the carriage after the same is placed in the automobile or other vehicle. With the baby carriages now in commercial use, it is necessary to collapse the chassis whenever the occasion requires that the carriage be placed in an automobile. In most, if not all, of such instances, by virtue of the construction of the baby carriage with the collapsible chassis, after the carriage is confined in the automobile or other vehicle it is not safe or comfortable to place the baby in the baby carriage with the gear or chassis collapsed.

In our invention, the preferred construction of which is to be presently described, the baby carriage body is completely detached from the gear or chassis. The detached body is then placed in the automobile or other vehicle. In placing the body in such vehicle, part of the carriage body may rest upon the seat and the handle upon the back of the front seat of the vehicle, and the carriage body will be firmly and safely supported such that the baby may be placed therein. If desired, in such position the handle may be of a construction, which, when collapsed, may extend toward the floor of the automobile and support the front of the carriage, with the cooperation of the seat, within the carriage body. In either case, the carriage body, when confined in the vehicle, will be safe to support the baby therein. The collapsible carriage may then be placed in the trunk of the automobile or other convenient place therein, without interfering with the seating capacity. Thus, it is apparent that the principal object of our invention is the provision of a baby carriage in which the body, whether collapsible or rigid, may be detached from the chassis or gear for placement in the automobile or other vehicle, and conveniently and safely support the baby therein. In other circumstances it may be desired to store the baby carriage in the automobile during transit. Oftentimes the storage compartment is sufficiently large enough to receive the baby carriage if the body and chassis are separated, but too small to receive the body attached to the chassis. Thus, it will be apparent that in such instances the baby carriage body may be detached from the chassis or gear and both conveniently placed in the storage compartment for transit.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 3 is a fragmentary top plan view of the latch mechanism embodied in the invention;

Fig. 4 is a sectional detail view taken substantially on line 4—4 of Fig. 3;

Fig. 5 is a fragmentary sectional detail view of the carriage and latching mechanism showing the body of the carriage detached from the chassis.

Figure 1:
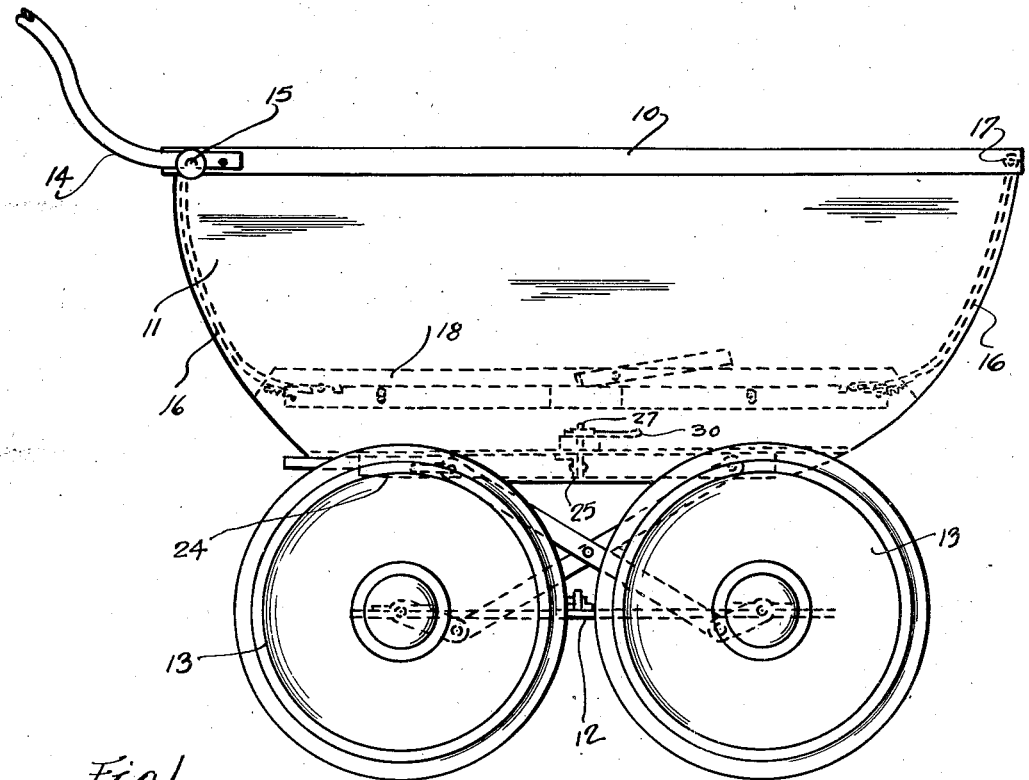
Fig. 1 is a typical side elevational view of the baby carriage embodied in our invention.
Figure 2:
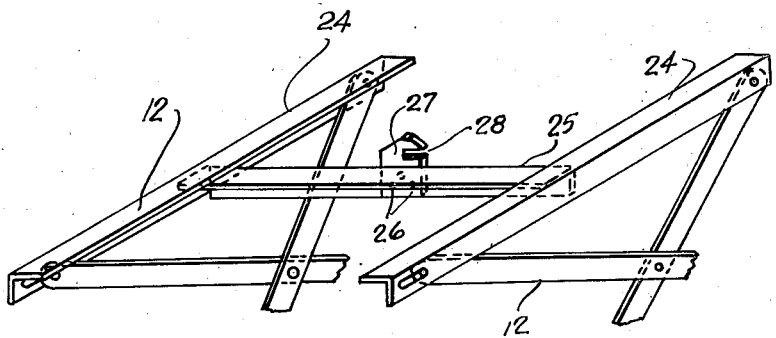
Fig. 2 is a fragmentary perspective view of the gear or chassis.

The drawings illustrate our preferred form of construction for carrying the invention into effect and by which the several objects of the invention may be accomplished.

In this preferred form of construction the baby carriage is indicated generally at 10 and comprises the carriage body 11 and the gear or chassis 12 including the usual wheels 13. To the body 10 is attached in any suitable manner a handle 14. The handle 14 may be rigidly attached to the body 10 or it may be collapsibly attached thereto as at 15 in a manner fully shown in our copending applications, Serial Nos. 533,132 and 533,133.

The body 11 may be of the rigid type or of the collapsible type and when collapsible it may be constructed in accordance with the disclosure of our aforesaid pending applications. In the present application we have shown the body to be of a collapsible type and collapsible in a manner fully shown in the aforesaid pending applications. Briefly, this is accomplished by the provision of a pair of stays 16 attached to the body as at 17 and adjustably connected to the footwell 18 in the manner shown in the aforesaid pending applications. As the collapsibility constitutes no part of the present invention, we do not deem it necessary to go into descriptive detail of the construction of the mechanism for accomplishing that purpose, other than to say that upon moving the stays 16 toward each other, the body 11 may be collapsed.

This footwell comprises side walls 19 and a bottom wall 20. On this bottom wall 20 is fixed, in any suitable manner, a transversely extending mounting bar 21 having an elongated slot 22 formed therein and registering with a slot 23 formed in the bottom wall 20.

The chassis 12 comprises side bars 24. Extending transversely between these side bars 24 is an angle bar 25. To this angle bar 25 is attached as at 26 a keeper lug 27. This keeper lug 27 has a keeper notch 28 formed therein, and the keeper lug is adapted to project upwardly through the slots 22 and 23 when the body 11 is positioned upon the gear or chassis 12.

Carried by the mounting bar 21 is a guide strap 29. Pivotally carried as at 30' by the mounting bar 21 is a lever 30 comprising a latch head 31 and a handle portion 32. This lever 30 pivotally moves beneath the guide strap 29, which guide strap also functions to limit the pivotal movement of the lever 30 in an anticlockwise direction.

This lever 30 is adapted to have its latch head 31 engage the keeper notch 28 of the keeper lug 27 in a manner such that the body 11, when mounted upon the chassis or gear 12, will be firmly latched in position upon such gear or chassis 12.

To prevent accidental displacement of the latch head 31 from engagement in the keeper notch 28, there is provided a spring 33 which urges the latch head 31 into latched engagement with the keeper notch 28. This spring 33 has one end 33' connected as at 34 to the mounting block and an opposite end 35 connected as at 36 to the latch head 31. It is clear that to remove the body 11 from connection with the gear or chassis 12, all that need be done is to pivot the lever 30 against the action of the spring 33 to disengage the latch head 31 from the keeper notch 28, whereupon the carriage body 11 may be removed from the gear or chassis 12 and, as before stated, placed in a position within an automobile or other vehicle, with a portion of the body 11 resting upon the rear seat and the handle 14 resting upon the back of the front seat, thus forming a complete and safe support for the body 11 when the baby or child is placed therein.

The simplicity of construction of our invention is apparent from the foregoing description.

When the body 11 is placed in the automobile or other vehicle, the gear or chassis 12 may be collapsed and placed in the storage compartment of such vehicle.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A baby carriage including a chassis having opposite side rails, a member extending transversely of the chassis and supported by the side rails, a keeper lug carried by said member and extending upwardly therefrom, a carriage body, a mounting member in said body and having an elongated slot formed therein registering with an elongated slot formed in the body, said keeper lug being adapted to project through said slots when said body is mounted on said side rails, and a latch lever pivotally carried by said mounting member and adapted to have latched engagement with said keeper lug for releasably latching said body upon said side rails.

2. A baby carriage including a chassis having opposite side rails, a member extending transversely of the chassis and supported by the side rails, a keeper lug carried by said member and extending upwardly therefrom, a carriage body, a mounting member in said body and having an elongated slot formed therein registering with an elongated slot formed in the body, said keeper lug being adapted to project through said slots when said body is mounted on said side rails, a latch lever pivotally carried by said mounting member and adapted to have latched engagement with said keeper lug for releasably latching said body upon said side rails, and spring means for retaining said latch member is latched engagement with said keeper lug.

SAMUEL KROLL.
NATHAN J. KROLL.

REFERENCES CITED

The following references are of record in the file of this patent:

UNITED STATES PATENTS

| Number | Name | Date |
|---|---|---|
| 525,908 | Klauberg | Sept. 11, 1894 |
| 1,193,896 | Hensel | Aug. 8, 1916 |
| 1,355,925 | Stone | Oct. 19, 1920 |

FOREIGN PATENTS

| Number | Country | Date |
|---|---|---|
| 256,270 | Germany | Feb. 5, 1913 |